Figure 1:
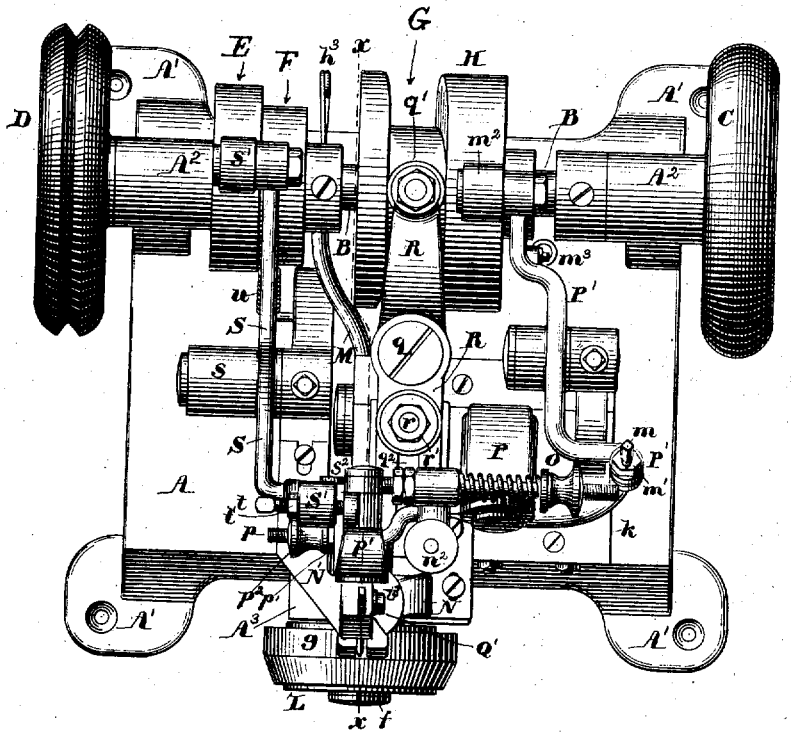

5 Sheets—Sheet 1.

J. B. HADAWAY.

STITCH SEPARATING AND INDENTING MACHINE.

No. 11,538.

Reissued May 12, 1896.

Witnesses:
Walter E. Lombard
R. S. Bacon

Inventor:
John B. Hadaway,
by Benjamin Phillips
Atty.

5 Sheets—Sheet 2.

J. B. HADAWAY.

STITCH SEPARATING AND INDENTING MACHINE.

No. 11,538. Reissued May 12, 1896.

Witnesses:
Walter E. Lombard
R. S. Bacon

Inventor:
John B. Hadaway,
by Benjamin Phillips
Att'y

5 Sheets—Sheet 3.

J. B. HADAWAY.

STITCH SEPARATING AND INDENTING MACHINE.

No. 11,538.

Reissued May 12, 1896.

Witnesses:
Walter E. Lombard
F. S. Bacon

Inventor:
John B. Hadaway,
by Benjamin Phillips
Att'y.

J. B. HADAWAY. 5 Sheets—Sheet 4.

STITCH SEPARATING AND INDENTING MACHINE.

No. 11,538. Reissued May 12, 1896.

Witnesses:
Walter E. Lombard.
F. S. Bacon

Inventor:
John B. Hadaway,
by Benjamin Phillips
Atty.

J. B. HADAWAY.
STITCH SEPARATING AND INDENTING MACHINE.
No. 11,538. Reissued May 12, 1896.
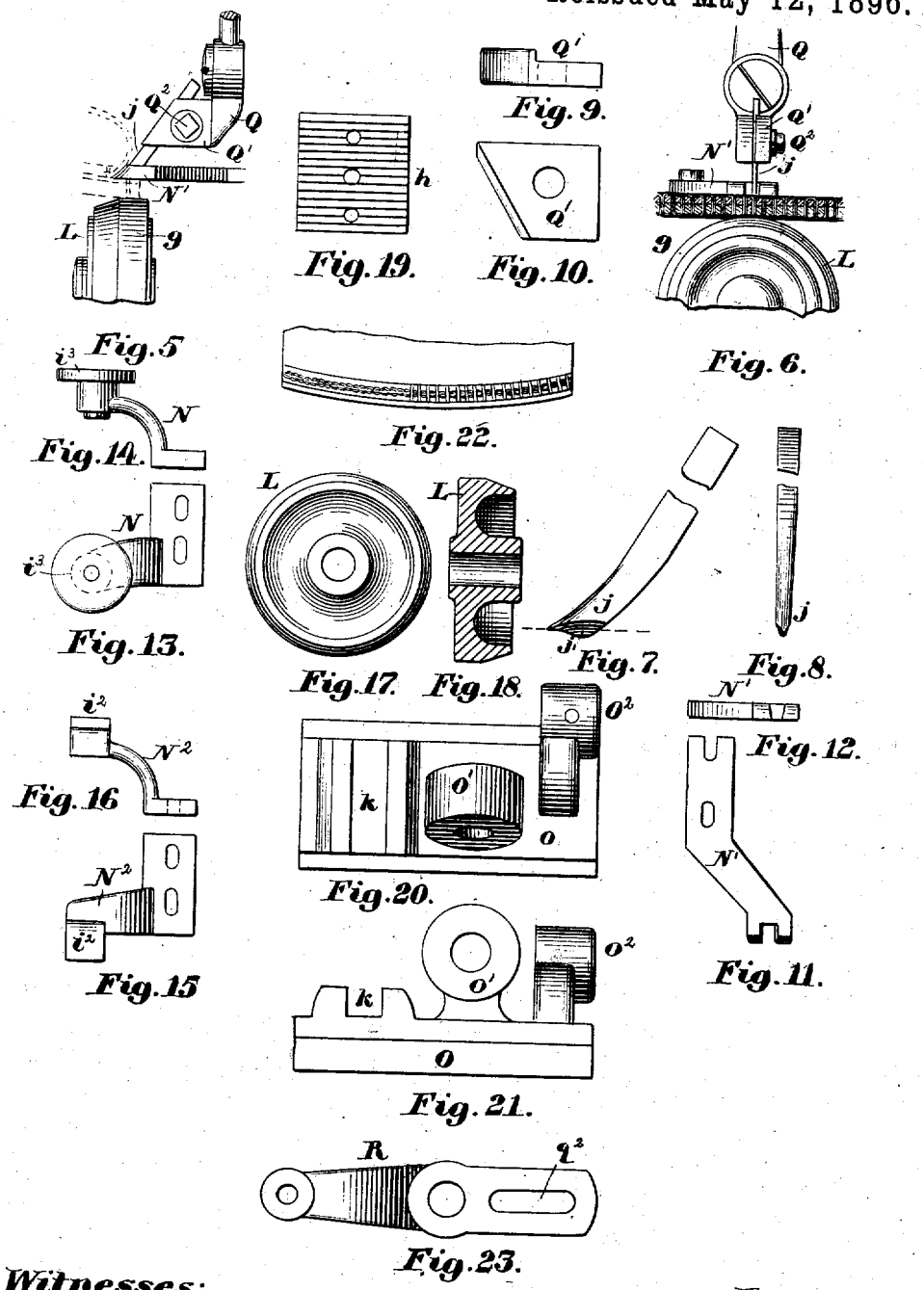
Witnesses:
Walter E. Lombard
R. S. Bacon
Inventor:
John B. Hadaway,
by Benjamin Phillips
Atty.

UNITED STATES PATENT OFFICE.

JOHN B. HADAWAY, OF BROCKTON, MASSACHUSETTS.

STITCH SEPARATING AND INDENTING MACHINE.

SPECIFICATION forming part of Reissued Letters Patent No. 11,538, dated May 12, 1896.

Original No. 521,978, dated June 26, 1894. Application for reissue filed March 13, 1896. Serial No. 583,133.

*To all whom it may concern:*

Be it known that I, JOHN B. HADAWAY, of Brockton, in the county of Plymouth and State of Massachusetts, have invented a new and useful Stitch Separating and Indenting Machine, of which the following, taken in connection with the accompanying drawings, is a specification.

My invention relates to a stitch separating and indenting machine; and it consists in certain novel features of construction, arrangement, and combination of parts, which will be readily understood by reference to the description of the accompanying drawings, and to the claims hereto appended, and in which my invention is clearly pointed out.

In the manufacturing of boots and shoes of that class in which the outer soles are secured thereto by sewing through said sole and a welt secured to the upper and inner sole it has been customary after the sole has been sewed to the welt to perform the operation called in the trade "pricking up the stitches," which consists in pressing a sharp-edged tool between each two contiguous stitches on the upper side of the welt from the forward end of the shank on one side around the forepart to the same point on the other side to clearly define the division between the stitches and thus improve the appearance of the boot or shoe.

The object of my invention is the production of a machine that will accurately separate or prick up the stitches regardless of slight variations in their lengths, the separating or pricking-up tool being automatically adjusted to the division between two stitches before being depressed, said automatic adjustment being effected by the stitch itself. To accomplish this, I have produced the machine illustrated in the accompanying drawings, in which—

Figure 2:
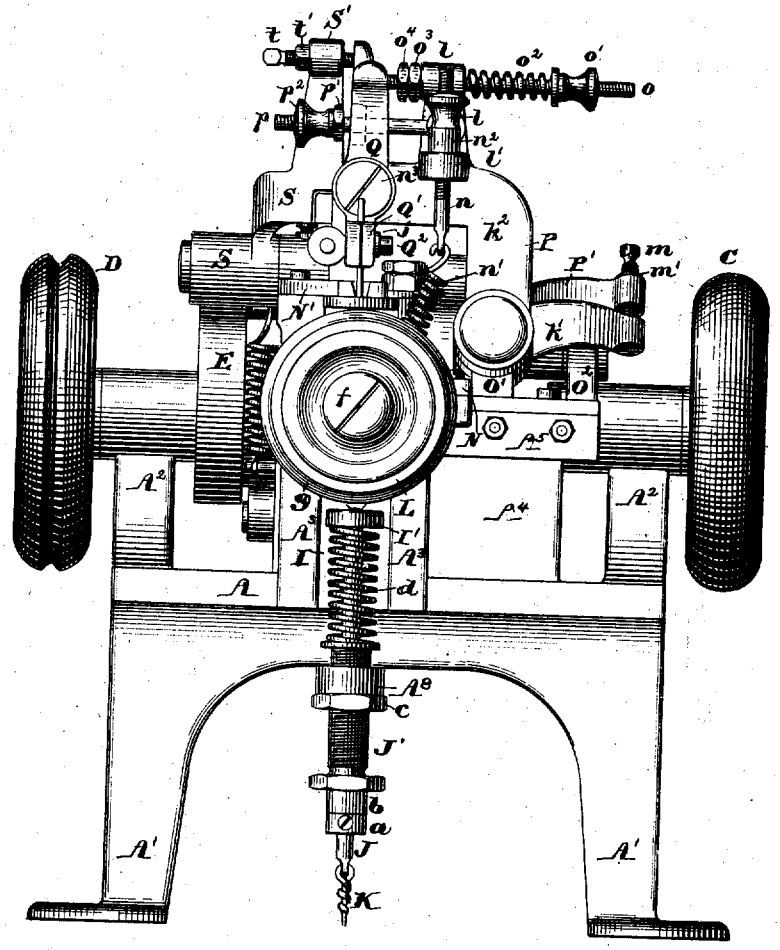
Figure 3:
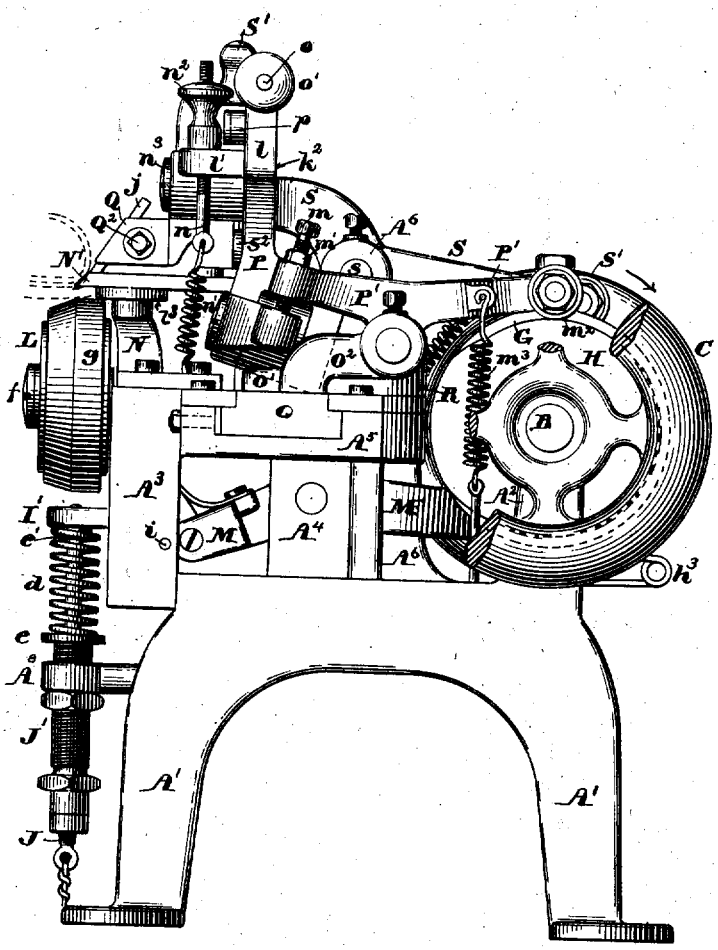
Figure 4:
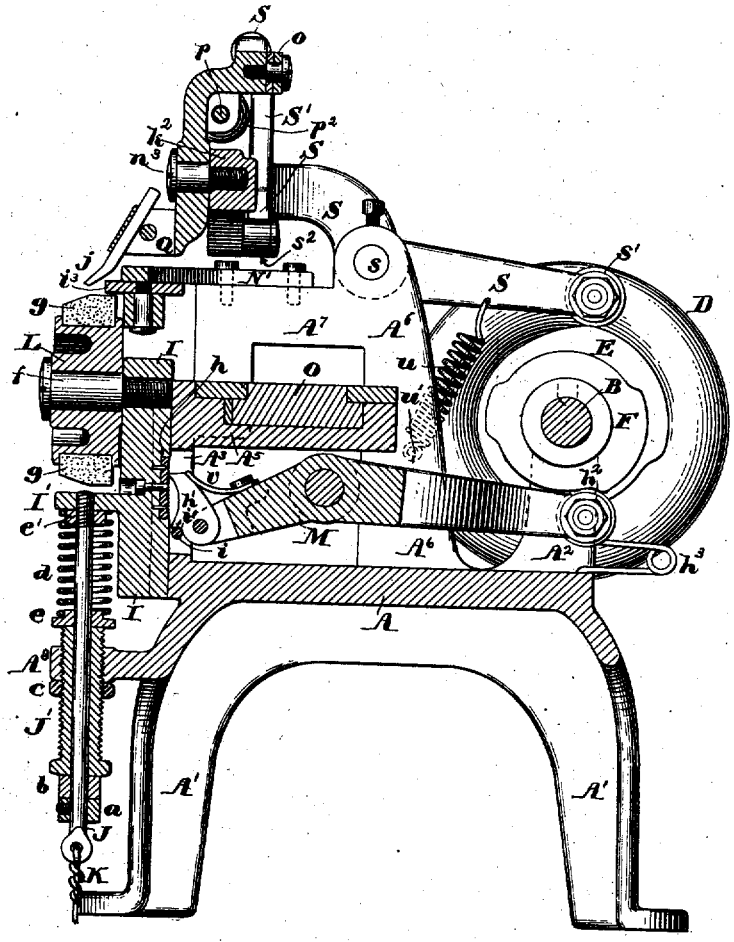

Figure 1 is a plan. Fig. 2 is a front elevation. Fig. 3 is a side elevation with a portion of the hand-wheel broken away. Fig. 4 is a sectional elevation, the cutting-plane being on line *x x* on Fig. 1 and looking toward the left of said figure. Fig. 5 is a side elevation of portions of the revolving work-support, the fixed welt-bearing work-support, the separating-tool and its carrying-lever, with the shoe shown in position. Fig. 6 is a front elevation of the same parts. Figs. 7 and 8 are respectively a side elevation and a front elevation of the separating-tool removed from the machine and drawn to an enlarged scale. Figs. 9 and 10 are respectively a plan and a side elevation of the clamping-plate for securing the separating-tool to its carrier. Figs. 11 and 12 are respectively a plan and a front end view of the welt-bearing work support or table. Figs. 13 and 14 are respectively a plan and an elevation of a revoluble gage and its holder. Figs. 15 and 16 are similar views of a modification of the gage and its support made in piece. Figs. 17 and 18 are respectively a front elevation and a longitudinal section of a modification of the revoluble work-support. Fig. 19 is an elevation of the ratchet-plate, looking toward the left of Fig. 4. Figs. 20 and 21 are respectively a plan and a front elevation of the horizontally-reciprocating slide which carries the rocking separator-lever and the trip-lever. Fig. 22 is a plan view of a portion of a shoe-sole and welt united by a line of stitches and showing a portion of its length as it appears after the stitches have been acted upon by my machine. Fig. 23 is a detail plan view of feed-lever.

In the drawings, A is the bed of the machine, provided with the legs A′ A′, which may be formed integral with or be secured to said bed in any suitable manner and by which the machine may be secured in the desired position upon a bench or table. (Not shown.)

The bed A has formed upon or secured to its upper side the upwardly-projecting stands $A^2$ $A^2$ in suitable bearings, in which is mounted the driving-shaft B, having mounted upon one end the hand-wheel C, upon its other end the grooved driving-wheel D, and between its two bearings the face-cams E and F and the combined cylinder and face-cam G H.

The bed A has formed in one piece therewith the upwardly-projecting blocks $A^3$ and $A^4$, connected at their upper ends by the plate $A^5$, and also the upwardly-projecting stand $A^6$, having the forwardly-projecting angular portion $A^7$, also connected to the plate $A^5$. In the front face of the block $A^3$ is formed a T-shaped vertical groove, to which is fitted so as to be movable vertically therein the bar I, provided with the outwardly-projecting lug I', into which is screwed the pendent rod J, which passes through the threaded sleeve J', adjustably set in the ear $A^8$, formed upon or secured to the bed A, as shown in Figs. 3 and 4. The lower end of the rod J is connected by any suitable means, as K, to a treadle, (not shown,) and has adjustably secured thereon the collar *a*, between which and the lower end of the sleeve J' it is surrounded by the rubber cushion *b*, to take the blow of the upward movement of the bar I when the foot is removed from the treadle. The sleeve J' has fitted thereon the check-nut *c*, to clamp it firmly to the ear $A^8$ in the desired adjusted position. Between the upper end of the sleeve J' and the under side of the lug I' the rod J is surrounded by the coiled spring *d*, which is held in place concentric with the axis of the rod J by the collars *e* and *e'*, as shown in Fig. 4. The upper end of the bar I has set therein a stud *f*, upon which is mounted so as to be revoluble thereon the lower work-support L, which may be formed from a single piece of metal, as shown in Figs. 17 and 18, or it may be composed of a metal center having formed therein a circumferential groove, in which is mounted a rubber band *g*, to form a yielding cushion, as shown in Fig. 4, which is the construction I prefer for most work.

The bar I and the work-supporting wheel L are pressed upward by the spring *d* with a yielding pressure, and said bar has set in its back side the hardened steel ratchet-plate *h*, having teeth, the shoulders of which are downward and are engaged by the pawl *h'*, carried by the lever M, pivoted to the block $A^4$ and carrying at its rear end the roll $h^2$, which is acted upon by the cam F to depress the rear end of said lever and cause the pawl *h'* to engage the ratchet-plate *h* and lock the bar I and wheel L in their raised positions while the stitches are being separated and the welt indented, the roll $h^2$ being kept in contact with the cam F by the spring $h^3$. (Shown in Figs. 1, 3, and 4.)

The block $A^3$ has cut through it at the back of the groove therein a slot to permit access of the pawl *h'* to the ratchet-plate *h*, and the side of said slot has set in a fixed position therein a pin *i*, with which the shoulder *i'* on said pawl engages when the front end of the lever M is moved downward, and thus insures the disengagement of said pawl from the teeth of the ratchet-plate. A gage-stand N or $N^2$ is adjustably secured to the upper end of the block $A^3$ and may be provided with a fixed gage-lip $i^2$, as shown in Figs. 15 and 16, or it may have a revoluble gage-wheel $i^3$ mounted thereon, as shown in Figs. 1, 3, 4, 13, and 14. Just above said gage and adjustably secured to the upper side of the bar $A^7$ of the frame is the upper work support or table N', against which the welt of the shoe is pressed when the tread-surface of the sole is placed upon the lower work-support and the operator's foot is removed from the treadle.

The table N' has its front end beveled, so as to enable it to enter well into the rand and fit the inclined surface of the upper at its junction with the welt, as shown in Fig. 5, as in some cases it may serve as a gage by pressing against the upper, as shown in said figure. The front end of said table is slotted, as shown in Figs. 1, 4, 11, and 12, for the passage of the stitch-separating tool J.

The plate $A^5$ has formed therein a horizontal T-shaped groove extending parallel to the axis of the shaft B and has fitted therein, so as to be movable endwise thereof, the plate O, having formed in its upper side the rectangular groove *k*, extending transversely thereof, and also having formed integral therewith the ears O' and $O^2$, as shown in Figs. 20 and 21. The ear O' has pivoted thereto the lever P, one arm, *k'*, of which extends in a nearly-horizontal direction to the right of its pivotal connection to said ear, and the other arm, $k^2$, of which extends upward, then to the left, and then downward in the form of a goose-neck and is provided with the upwardly-projecting lug *l* and the laterally-projecting lug *l'*.

P' is the trip-lever, pivoted to the ear or stand $O^2$ and provided at its front end with the set-screw *m*, adjustably set therein and secured in its adjusted position by the check-nut *m'*, the end of said set-screw being arranged to act upon the end of the arm *k'* of the lever P to depress said arm by the action of the face-cam H, formed on the right-hand end of the cylinder-cam G, as viewed in Fig. 1, upon the truck or roll $m^2$, mounted upon a stud set in the end of the rearwardly-projecting arm of said lever, said truck being held in contact with said cam by the tension of the spring $m^3$, as shown in Fig. 3.

The lug *l'* of the lever P has suspended therefrom the rod *n*, to the lower end of which is connected one end of the spring *n'*, the other end of which is connected to some fixed portion of the machine and serves to move the arm $k^2$ of the lever P downward, the tension of said spring being regulated by the thumb-nut $n^2$. (Shown in Figs. 1, 2, and 3.)

The stitch-separating tool *j* has its lower end made of a rounded V shape, as viewed from the front of the machine, and is adjustably secured to the lower arm of the tool-stock Q by the clamping-plate Q' and screw $Q^2$, as shown in Figs. 1, 2, 3, 9, and 10.

The tool-stock Q is pivoted at $n^3$ to the lever P, so as to be movable to a very limited extent about said pivot, and has pivoted to its upper end the threaded rod *o*, which extends horizontally therefrom through an eye in the lug *l*, and has fitted to its right-hand end the thumb-nut *o'*, between which and the lug *l* it is surrounded by the spring $o^2$, the tension of which is regulated by said thumb-nut and tends to move the upper end of the tool-stock toward the right of Fig. 2. The rod *o* also has fitted thereto, between the tool-stock Q and the lug *l*, the stop-nut $o^3$ and check-nut $o^4$, which serve to limit the movement of the upper end of said tool-stock toward the right of Fig. 2. The lug $l$ has pivoted thereto the threaded rod $p$, which extends therefrom toward the left of Fig. 2 through an ear on the back side of said tool-stock, and has fitted thereto at the left of said stock the stop-nut $p'$ and thumb-nut $p^2$, which serve to limit the movement of the upper end of the stock Q toward the left of Fig. 2.

R is the feed-lever, pivoted to the plate $A^5$ at $q$, which carries at its rear end the truck $q'$, which is acted upon by the path of the cylinder-cam G to vibrate it about its pivot, as shown in Fig. 1.

The lever R has formed in its front arm the slot $q^2$, in which is adjustably secured by the clamping-nut $r$ the stud $r'$, carrying at its lower end a rectangular block, which fits into the transverse groove $k$ in the plate O, as a means of reciprocating said plate to a greater or less extent, according to the adjustment of the stud $r$ to a greater or less distance from the fulcrum of the lever R.

S is the pressure-lever, pivoted at $s$ and carrying at its rear end the roll or truck $s'$, which is engaged and acted upon by the face-cam E to vibrate said lever about its fulcrum-pin $s$. The front arm of the lever S extends upward and forward from its fulcrum for a short distance and is then bent at right angles toward the right of Fig. 1 and bears upon a roll $s^3$, mounted upon a stud set in the downwardly-turned end of the arm $k^2$ of the lever P, to depress said arm and the tool-stock and tool to indent the welt, as shown on the right-hand portion of Fig. 22. The front arm of the lever S is also provided with the upwardly-projecting arm S', in the upper end of which is adjustably mounted the set-screw $t$ in position for its end to be engaged by the upper end of the tool-stock when it is moved toward the left of Fig. 2, and thus limit such movement of the upper end of the tool-stock, while its lower end is moved a greater distance to feed the work, while the separating and indenting tool is depressed between two stitches. The set-screw $t$ is firmly held in its adjusted position, when set, by the check-nut $t'$, and the roll $s'$ is kept in contact with the periphery of the cam E by the tension of the spring $u$, connected at one end to the lever S and at its other end to the pin $u'$, which is set in a fixed position in the stand $A^6$. The pawl $h'$ is pressed into contact with the ratchet-plate by the spring $v$ in a well-known manner.

The operation of my invention is as follows: The several parts of the machine being in the positions shown in the drawings the operator first turns the hand-wheel in the direction indicated by the arrow on Fig. 3 a distance equal to about one hundred and twenty degrees, when the separator-tool will have been raised to its extreme height and moved to the extreme of its movement toward the right from the position in which it is shown in Figs. 1 and 2, the front end of the pressure-lever S will have been raised so as to permit the tool-stock to be raised by the action of the front end of the trip-lever P' upon the end of the arm $k'$ of the lever P, and the pawl end of the locking-lever will have descended, causing the shoulder $i'$ of the pawl or pawls (as preferably a plurality of pawls $h'$, having slightly-varying lengths, are carried by said locking-lever) to come in contact with the pin $i$, and thus be thrown out of engagement with the teeth of the ratchet-plate $h$. The operator now places his foot upon the treadle and depresses the lower work-support L against the tension of the spring $d$ to a sufficient distance to permit the insertion of the sole edge between said lower work-support and the table N'. He then takes the shoe in his left hand with the heel toward the left and places the tread-surface of the sole upon the lower work-support at a point at the forward part of the shank with the upper surface of the welt beneath the upper work support or table N' and with the edge of the sole resting against the gage lip or wheel which has previously been adjusted to a position to bring the stitch to be operated upon directly beneath the bulge $j'$ on the lower end of the separating-tool $j$ when the cam-shaft is set in motion. The first effect produced by the revolution of the shaft B is to raise the front end of the trip-lever P', and thus release the rocking lever P and permit the tension of the spring $n'$ to move the arm $k^2$ of the lever P and the tool-stock downward and cause the end of the separator-tool $j$ to press lightly upon the stitch near the middle of its length. The sliding plate O is next moved toward the left a distance equal to nearly one-half its entire reciprocation, which should be about one and one-third the average length of the stitches in the sample of work to be operated upon, the stud in the slotted forward arm of the feed-lever having been previously adjusted to the proper point to impart to said slide the desired length of movement. This first movement of the plate O toward the left causes the point of the separator-tool to move in the same direction, resting lightly upon the stitch until its point drops into the slight indentation between two stitches, when the next stitch will prevent the point of said tool moving farther in that direction, when a continuation of the movement of the plate O will cause the upper end of the tool-stock Q to be moved toward the left, moving about the bearing of the tool $j$ upon the work until the upper end of the tool-stock comes nearly into contact with the stop-nut $p'$. When the first movement of the plate O and the lever P toward the left is completed, the cam F moves the lever M about its fulcrum, so as to raise the pawl $h'$ and cause it to engage the teeth of the ratchet-plate $h$ and lock the bar I firmly in position, when the cam E, acting upon the lever S, depresses the arm $k^2$ of the lever P and the tool-stock Q to cause the end of the tool $j$ to indent the welt and clearly define the separation between two stitches, the depth of the indentation being determined by the adjustment of the tool $j$ in its stock Q. The next movement is the depression of the front end of the locking-lever, causing the pawls $h'$ to be disengaged from the teeth of the ratchet-plate by coming in contact with the pin $i$, when the feed-lever will again be moved about its fulcrum by another throw in the cam G to complete the movement of the plate O toward the left of Figs. 1 and 2, and if the upper end of the tool-stock Q has not already come in contact with the stop-nut $p'$ or the set-screw $l$ it will continue to be moved about the lower end of the separating-tool as a fulcrum until it comes in contact with the set-screw $t$, when the movement of the upper end of said tool-stock toward the left will be arrested, and then as the movement of the plate O and lever P continues in that direction the lower end of the tool-stock and the tool carried thereby will be moved in the same direction and feed the work a distance equal to the length of a stitch, when the tool-stock will have assumed an upright position again with the stop-nut $o^3$ in contact with the lug $l$, as shown in the drawings. The locking-lever is now operated to cause the pawls $h'$ to engage the ratchet-plate and lock the work between the upper and lower work-supports, when the front end of the presser-lever will be raised from contact with the roll carried by the lever P, when the trip-lever P′ is acted upon by its cam to again depress its front end and the arm $k'$ of the lever P, thereby raising the arm $k^2$ of the lever P and the tool-stock and tool until the lower end of said tool is just above the under surface of the upper work support or table N′, when the motion of the feed-lever is reversed and the plate O is moved toward the right to its original position, at which time the cam-shaft will have completed one revolution, and as said shaft continues to revolve the hereinbefore-described operations will be repeated at every revolution until all the stitches have been separated from the point of beginning around the toe to the corresponding point on the other side of the shoe, and the tool will be depressed accurately between each two stitches regardless of the variations in the lengths of the stitches, which is the essential feature of my invention, together with the mechanism employed to accomplish this automatic selection of the several points where the indentations are to be made.

The depressions between the stitches are made of uniform depth and when done by gage on trimmed or finished edges will be of uniform distance from the bead on the edge of the sole, which is a very desirable thing to accomplish.

The nose of the upper work-support being set in line with or just in front of the separating-tool prevents the upper being scratched by the movements of said tool.

What I claim as new, and desire to secure by Letters Patent of the United States, is—

1. A machine for separating or pricking up the stitches in a welted shoe-sole comprising the following elements, viz., a work-support, a rocking lever or frame mounted upon a movable fulcrum-pin, a tool-stock pivoted to said rocking lever; a separating-tool carried by said tool-stock, a tension device constructed and arranged to hold said tool-stock in its normal position relative to said rocking lever until moved from said position by the application of power to overcome said tension, a cam and lever for positively moving said rocking lever about its fulcrum in one direction to raise said tool and its stock, a spring to move said parts in the opposite direction, stops to limit the vibrations of the tool-stock, a cam and lever for imparting to said rocking lever a positive reciprocation in a direction at right angles to the axis of its fulcrum-pin; and a cam and lever for applying force to said rocking lever to force said separating-tool into the work.

2. In a machine for separating the stitches of boot or shoe soles, the combination of a work-support; an automatically-adjustable separator for locating the intervals between the stitches whether of uniform or varying lengths; and means having provision for forcing said tool between the stitches when the point of said tool has located itself in the space between two stitches.

3. In a machine for separating the stitches in the soles of boots or shoes, the combination of a work-support to receive the tread-surface of the sole; an upper work support or table arranged to bear upon the upper surface of the welt; a separating-tool; means having provision for pressing said tool lightly upon the line of stitching, and moving it longitudinally thereof, in two steps, whereby said tool is made to automatically locate the intervals or spaces between the stitches whether of uniform or varying lengths; and mechanism having provision for forcing said tool between said stitches to separate them.

4. In a machine for separating the stitches of boot and shoe soles, the combination of a work-support to receive the tread-surface of the sole; an upper support or table to rest upon the upper surface of the welt; a gage to determine the position of the shoe; a rocking lever mounted on a movable fulcrum; a tool-stock pivoted to said lever by its middle; a separating-tool adjustably mounted in the lower end of said stock; a tension device for normally holding the upper end of said stock in a given position relative to said rocking lever; adjustable stops for limiting the vibration of said tool about its fulcrum; mechanism having provision for moving said rocking lever about its fulcrum in one direction with a positive and uniform motion; a spring for moving it in the opposite direction and pressing the separating-tool lightly upon the stitch; a cam and lever for reciprocating said rocking lever in a direction at right angles to the axis of its fulcrum-pin; and mechanism having provision for applying pressure, in addition to the spring, to said rocking lever to force the separating-tool into the work between the stitches.

5. In a machine for separating the stitches of boot and shoe soles, the combination of a revoluble work-support to receive the tread-surface of the sole; an upper work support or table arranged to bear upon the upper surface of the welt and slotted at its front end for the passage of the separating-tool; a gage to guide the work; mechanism having provision for clamping the sole edge between said revoluble work-support and the table; a rocking lever or frame mounted upon a movable fulcrum; a tool-stock pivoted to said rocking lever; a separating and indenting tool carried by said tool-stock; a tension device for holding said tool-stock in its normal position relative to said rocking lever; a spring for moving said rocking lever in one direction about its fulcrum; a cam and lever for reciprocating said rocking lever at right angles to its axis of oscillation; a cam and lever for applying pressure in addition to the tension of said spring to force the tool into the material between the stitches; and mechanism having provision for moving said rocking lever about its axis in the opposite direction, against the tension of said spring.

6. In a machine for separating the stitches of boot and shoe soles, the combination of a yielding work-support to receive the tread-surface of the sole; a ratchet-plate connected to said yielding support; an upper work support or table arranged to bear upon the surface of the welt; a lever; a cam constructed and arranged to intermittently vibrate said lever; a pawl pivoted upon said lever and arranged to engage the teeth of said ratchet-plate when the pawl end of said lever is moved upward; and a fixed pin to be engaged by said pawl, when it is moved downward, and throw it out of engagement with said ratchet, whereby said yielding work-support is alternately locked in a fixed position as to vertical movement, and rendered yielding.

7. In a machine for separating the stitches of a boot or shoe sole, the combination of the vertically-movable bar I; the work-support L carried thereby; the rod J pendent from said bar; the connection K leading from said rod to a treadle; the sleeve J′ surrounding said rod and adjustable vertically in a fixed bearing; the spring *d*; the collars *a*, *e*, and *e′*, the rubber cushion *b*; the ratchet-plate *h*; the pawl *h′*; the pivoted lever M; the cam F; and the fixed pin *i* all constructed, arranged and operating substantially as set forth.

8. The combination of the shaft B; the cams E, F, G and H; the horizontally-reciprocating plate O provided with the ears O′ and $O^2$ and the transverse groove *k*; the lever P provided with the arms *k′* and $k^2$ and the lug *l* and pivoted to the ear O′; the spring *n′* connected at one end to the arm $k^2$ of said lever P and at its other end to some fixed part of the machine; the tool-stock Q and the roll $S^2$ carried by the arm $k^2$; the tool *j* adjustably set in said tool-stock; the tension-rod *o* pivoted to said tool-stock and having a bearing in the lug *l*; the nuts *o′*, $o^2$ and $o^3$ fitted to and adjustable on said rod; the spring $o^2$; the lever S engaging the roll $S^2$ to depress the arm $k^2$ of the lever P and provided with the adjustable screw-stop *t*; the lever R provided with the adjustable stud *r′* carrying a rectangular block fitted to the groove *k*; and the lever P constructed and arranged to act upon the upper side of the arm *k′* of the lever P, all constructed and arranged to operate substantially as described.

9. In a machine for separating the stitches of boot or shoe soles the combination of a vertically-movable work-support to receive the tread-surface of the shoe-sole; mechanism having provision for intermittently locking said work-support in its raised position; a vertically-oscillating and horizontally-reciprocating lever or frame; a separating-tool carried by said lever; a spring connected to said lever and adapted to press said tool upon the stitch; mechanism having provision for moving said tool along said stitch under the tension of said spring until the point of said tool drops into the space between two stitches; means having provision for pressing said tool into said space and indenting the welt by a positive pressure in addition to the tension of said spring; mechanism for moving said tool another step in the same direction to feed the work: mechanism having provision for raising said tool from the work and moving it horizontally to the starting-point.

10. In a machine for separating the stitches of boot and shoe soles, the combination of a work-support; a gage to determine the position of the sole upon said support; an automatically-adjustable separator for locating the intervals between the stitches; and mechanism having provision for forcing said separator between the stitches when the point of said separator has been located between the stitches.

11. In a machine for separating the stitches of boot and shoe soles, the combination of a work-support to receive the tread-surface of the sole; an upper work support or table arranged to bear upon the upper surface of the welt; a gage to determine the position of the work on said supports; an automatically-operated separating-tool adapted to locate the intervals or spaces between the stitches whether of uniform or varying lengths; and mechanism having provision for forcing said tool between said stitches to separate them and indent the welt.

12. In a machine for separating the stitches of boot and shoe soles the combination of a work-support to receive the tread-surface of the sole; a gage to determine the position of said sole on the support; a vertically and horizontally movable separating-tool adapted to automatically locate the spaces between the stitches whether said stitches are of uniform or varying lengths; a spring for moving said tool into contact with the stitches; mechanism for moving said tool horizontally in one direction in two steps with a standstill between them: mechanism having provision for moving said tool another step downward by a positive pressure to force said tool into the work between two stitches; and mechanisms for raising said tool and moving it horizontally to its position before being depressed by the spring.

13. In a machine for separating stitches, the combination with a work-support, of a tool for locating the intervals between the stitches, and means operating automatically to locate said tool in the intervals between the stitches whether of uniform or varying length.

14. In a machine for separating stitches, the combination with a work-support, of locating and indenting means, and connected mechanisms operating automatically to actuate said means to locate and indent the intervals between the stitches after the sewing has been completed.

In testimony whereof I have hereunto set my hand, in the presence of two attesting witnesses, this 9th day of March, 1896.

JOHN B. HADAWAY.

Witnesses:
BENJAMIN PHILLIPS,
JAMES H. SISK.